May 1, 1951 H. WEIDNER 2,550,949
THREAD CHASING TOOL
Filed March 19, 1948
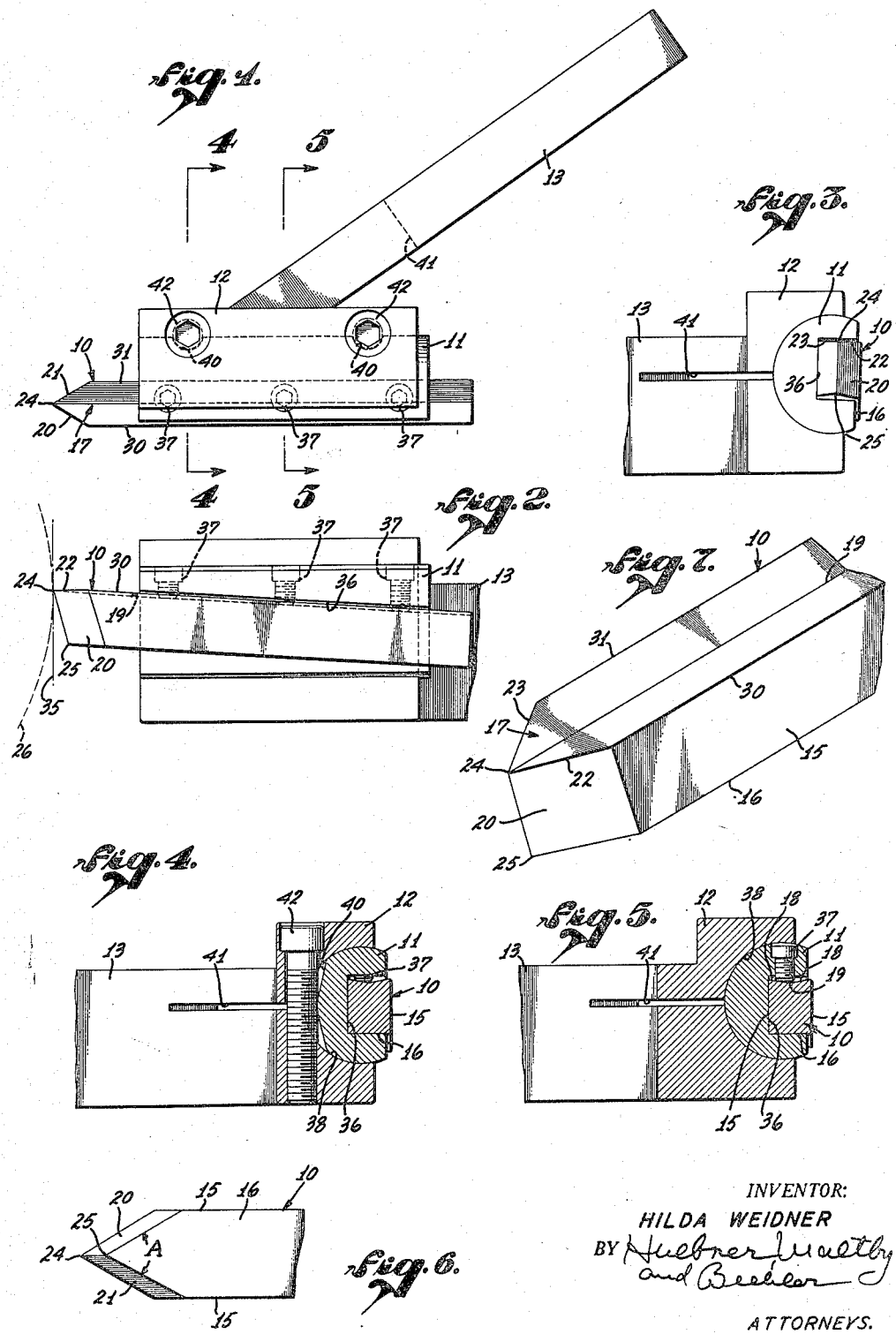
INVENTOR:
HILDA WEIDNER
BY Huebner Maltby
and Beeler
ATTORNEYS.

Patented May 1, 1951

2,550,949

UNITED STATES PATENT OFFICE 2,550,949

THREAD CHASING TOOL

Hilda Weidner, North Hollywood, Calif.

Application March 19, 1948, Serial No. 15,850

3 Claims. (Cl. 29—96)

The invention relates to tools and mountings therefore which are used upon machine lathes such as hand lathes, automatic lathes, turret lathes, and the like. The tool of this particular invention is one directed expressly to the successful cutting or chasing of threads on a work piece which is chucked up in the lathe.

Tools and bits for use in connection with lathes have been manufactured and ground in all sorts and varieties of shapes in order to accomplish the great variety of cutting jobs to which lathe operations are put. Ordinarily the set-up man or mechanic operating the lathe when a certain bit is needed selects a piece of tool steel and grinds the cutting edge to suit that special need. Such items of tool steel may come in any one of a variety of shapes and sizes usually having some predetermined geometrical form in cross section. In many instances they are merely rectangular or square rods.

For special jobs such as the cutting or chasing of threads on a cylindrical rod chucked up in the lathe, the bit or tool must be ground to a very definite angle in order that threads produced thereby have a proper shape. When the threads are being cut in a soft metal such as brass by use of a bit of hardened tool steel the point of the bit may be ground to a 60° angle, assuming that that is the angle between threads, and little difficulty will be experienced in running the bit along the bar stock for cutting or chasing the threads. The chips of brass fall away without appreciably interfering with the cutting operation.

When, however, it becomes necessary to cut or chase threads on bar stock of any one of a number of different steels, the cutting of threads becomes a considerably more difficult problem. When steel is cut the chips do not readily fall away from the cutting edge. Consequently, a thread chasing bit ground to a 60° angle at the point is ineffective for precision work in the cutting of threads in steel. Under such circumstances it has been the practice in the past for mechanics and lathe men to grind the cutting point on one side only in order that there may be ground on the bit a suitable rake angle which will allow the chips of steel to fall away properly. A tool ground in this manner is of course suitable for cutting one side only of a helical thread while the bit progresses in one direction. Thereafter another seizing bit, suitably ground on the opposite side also, must be used to cut along the helical thread on the opposite side. The cutting of threads in this way is naturally time consuming and expensive, but heretofore no ready alternative has been devised by means of which precision threads can be cut in steel.

It is therefore among the objects of the invention to provide a new and improved tool comprising a thread cutting or thread chasing bit by means of which threads of very close tolerance can be cut in steel by one passage of the bit through the work.

Another object of the invention is to provide a new and improved thread cutting or chasing tool which is adapted to greatly improve accuracy and precision in the cutting of threads in hard metals.

Still another object of the invention is to provide a new and improved thread cutting or chasing tool including a bit therefor which is adapted to greatly increase not only the speed and accuracy of the cutting of threads in hard metal, but also to improve the speed and accuracy of sharpening and reconditioning the cutting edges of the bit.

A further object of the invention is to provide a new and improved thread cutting tool and a bit for use therewith in which the efficiency of the cutting or chasing of threads is greatly improved and wherein the efficiency is maintained to an equal degree regardless of the kind of metal in which the threads are cut.

Still further among the objects of the invention is to provide a new and improved thread cutting bit in which is provided a cutting edge for cutting both sides of the helical trough between threads during one single passage of the bit through the work each edge being provided with a proper rake angle. The objects include the provision of a suitable mounting for the bit such that the cutting angle is maintained at the proper degree in spite of the presence of a rake angle on both sides and also to provide a suitable adjustment so that the cutting end of the bit may be mounted in a direction following the helical part of the trough between threads to the end that, especially in the cutting of hard metals, there will be no binding for want of sufficient clearance between the bit and surfaces of the threads already cut.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a plan view of the tool showing the parts in place ready for adjustment in a lathe.

Figure 2 is a side elevational view of the tool.

Figure 3 is a front elevational view of the tool.

Figure 4 is a cross sectional view taken on the line 4—4 of Figure 1.

Figure 5 is a cross sectional view taken on a line 5—5 of Figure 1.

Figure 6 is a fragmentary bottom view of the cutting end of the bit or tool shaft.

Figure 7 is a perspective view of the cutting end of the bit.

In the grinding of bits or tools provided with cutting edges which are used in lathes for removal of metal from a work piece a number of factors must be kept in mind if the tool is to operate with a maximum of success. The harder the material comprising the work piece, the more important careful observance of the critical factors becomes.

For the bit to be able to cut into the metal or other material comprising the work, there must be a clean sharp cutting edge. Practice has decreed that the sides or faces of the bit forming the cutting edge must be at an angle somewhat less than 90° for successful cutting. It is important also, however, that the angle be not too sharp. Although a sharp angle cuts with perfect satisfaction for a short length of time, it becomes dull too soon and the efficiency of the cutting operation becomes considerably impaired.

Another important factor is to make certain that the angle of cut is substantially 90°. This means that the direction of application of force at the cutting edge be at substantially 90° to a line drawn tangent to the work piece at the point of contact.

In cutting hard metals such as steel, if the chips of metal are to fall away from the cutting edge there must be what is designated in the trade as a rake angle immediately behind the cutting edge. To provide a rake angle the bit is ground so that it slopes away from the cutting edge by an angle of some 15 to 20°, or in some instances less, from the direction of application of pressure of the cutting edge against the work. Unless there is a rake angle present in the cutting of steel the chips cut from the work will tend to accumulate on the cutting edge and spoil the sharpness and smoothness of the cut.

It is also necessary to provide a clearance between the face of the bit adjacent the work and the surface of the work. This means that the lower face of the bit which forms the cutting edge and which is located on the side of the cutting edge opposite from the face forming the rake angle must be cut back so that it will not tend to rub frictionally against the work at any point following the cut and also so that there will be no binding effect in the event that chips chance to accumulate between the work and the bit. In practice a suitable clearance angle may be as much as 8°.

Obviously for the making of cuts of varied character bits having additional rake angles and clearances may be required, particularly where the bit is given some special shape in order to cut at more than one location at one time. Such rake angles and clearance angles are commonly designated as side rake angles and forward or side clearance angles.

In the cutting of the threads, the provision of rake angles and clearance angles is even more important than in the making of ordinary cuts. There are, however, in the cutting of threads a limited number of rake and clearance angles to be taken into consideration. Although a variety of different threads are in common use, the more usual types are designated as standard thread and acme thread. The standard thread provides an angle between adjacent faces of the threads of substantially 60°, whereas the angle of the acme thread is about 29°. Inasmuch as threads have been largely standardized, a tool which is capable of being ground so as to cut a 60° thread will ordinarily find universal acceptance. Since the principles involved in the present invention are substantially the same for the 60° angles as would be utilized for other angles, it is felt that a description identifying the bit as one capable of cutting a 60 degree thread will be sufficient to disclose the principle of operation so that it can be adapted to bits capable of cutting threads of other angles.

As illustrated in the drawings, a bit 10 consisting of a shaft of tool steel is shown retained by a tool holder 11, which in turn is carried by a mounting 12. The mounting is ordinarily provided with a bracket 13 adapted to fit into the tool carrying mechanism of a lathe. Inasmuch as the construction of the shaft providing the bit is important and has a bearing upon the means of mounting the bit in a suitable retainer, details of the construction of the bit will be first considered.

As is more readily apparent in Figures 4 and 5, the shaft 10 is substantially rectangular in shape in that it is shown provided with vertical parallel side walls 15 and a bottom wall 16.

The top wall instead of being plane surfaced and parallel to the bottom wall 16 is made in the shape of a very shallow V-shaped trough 17, comprising side portions 18 of equal width. The side portions converge along a central line of junction 19 which extends from one end to the other of the shaft.

In order to form a cutting point or cutting edges at the working end of the bit or shaft, the shaft is ground to provide faces 20 and 21. The position of the faces 20 and 21 is of primary importance in the forming of a proper cutting point and cutting edges. The faces 20 and 21 are identical in shape, area and configuration. At the junction of the faces with the side portions 18 of the trough there are formed cutting edges 22 and 23. These cutting edges converge at a point 24 which is at the bottom of the trough, along the central line of junction. The cutting edges 22 and 23 are disposed, ordinarily, at an angle of 60° with respect to each other. This means that the top sides of the faces 20 and 21 are similarly disposed at an angle of 60°.

It is important, however, that the faces 20 and 21 be cut back inwardly toward the center of the shaft by a desirable amount. By sloping the faces inwardly a lower point of convergence 25 is displaced axially along the shaft as indicated in Figure 2 so that a forward edge between the points 24 and 25 slopes back away from the work or work piece, a typical work piece being indicated by the dotted line 26. Moreover by sloping the faces 20 and 21 inwardly as described, an angle indicated by the character A, which is included between the bottom edges of the faces 20 and 21 will be less than 60° under circumstances where the angle between the cutting edges 22 and 23 is 60°. By thus directing the positions of the faces 20 and 21, a desirable clearance or side rake angle is established below the cutting edges 22 and 23.

On the upper sides of the cutting edges 22 and 23 lie the portions 18 of the trough and the slope of the trough illustrated is one adapted to establish the degree to rake angle suitable for work on most ordinary types of steels. The rake angle may be approximately 8° on each side. This means that the slope of each side portion 18 with respect to a horizontal plane, as viewed in Figure 5, for example, will be about 8°. In trade parlance pitching the sides as just described is said to result in an included angle of 16° where the angle on each side is 8°. The angle of pitch, of course, may vary, depending upon the hardness of resistance to cutting of the metal comprising the work piece, but is rarely made less than 5° for ferrous materials and never more than 15°. For softer metals, as for example brass, the angle may be as little as 2°.

It should also be noted that in forming cutting edges 22 and 23 by grinding faces 20 and 21 on the shaft, the cutting edges are pitched downwardly and inwardly from outside edges 30 and 31 of the shaft. Because of this downward pitch, if the shaft 10 were applied against the work so that the longitudinal axis of the shaft were to make a 90° angle with a line 35 tangent to the work at the point of contact, the cutting edges 22 and 23 would be pitched downwardly from a perpendicular relationship at the point of contact and improper cutting would result.

Therefore, in the use of this particular tool the longitudinal axis of the shaft 10 must be pitched at an angle to compensate for the downward pitch of the cutting edges 22 and 23. To this end the holder 11 is provided with a recess 36 the longitudinal axis of which is pitched so as to compensate for the downward pitch of the cutting edges 22 and 23. The recess 36 is best illustrated in Figure 2. Thus located the cutting edges 22 and 23 extend perpendicular to the tangent line 35 at the point of contact of the point 24 with the work 26. This is a proper cutting position. In this position the rake angles immediately behind the respective cutting edges 22 and 23 assume their proper relationship to the point of contact of the cutting edges with the work. In this position also the clearance angle of the edge between the points 24 and 25 and also the side rake angles of the faces 20 and 21 are also correct.

As also illustrated in the drawings there are provided set screws 37 in the holder, which can be tightened into place against the shaft in order to securely anchor the shaft in the recess 36.

To assist in retaining the holder in place there is provided in the mount 12 an arcuate recess 38, the extent of the arc being slightly greater than a semi-circle so that the holder must be slid into the arcuate recess endwise. Thus constructed there is no likelihood of the holder being torn from the mount under severe working conditions.

By making the relationship of the holder to the mount an arcuate relationship, the holder may be adjusted about its horizontal axis so that the edge between the points 24 and 25 can be tilted slightly with respect to the vertical. The tilt is best illustrated in Figure 3. Tilting of the shaft in this manner is important in order to make certain that the side rake angles of the faces 20 and 21 bear a proper relationship to the sides of the grooves between the threads as they are cut. This is prompted by the fact that when threads are cut they are cut in a helical direction and if the edge between the points 24 and 25 were maintained vertical, the clearance on the advancing face provided by the side rake angle would be less than that necessary, whereas the clearance on the face opposite from the advancing face would be greater than that necessary. This would result in a binding on one face. To eliminate such binding tendency the shaft is shifted as described, about its longitudinal axis, so that the edge between the points 24 and 25 follows the direction of the helical groove between threads.

To enable the holder to be adjusted in the manner just described pockets 40 are cut on the arcuate exterior of the holder, there being preferably provided two pockets. These pockets are most effective when shaped as illustrated in Figure 4. By thus shaping the pockets, a limited adjustment of the holder 11 is permitted about its horizontal axis, but the adjustment is ample to accommodate the holder and the shaft carried by it to follow the helical groove of all threads ordinarily encountered.

For maintaining the holder in place on the mount the mount is provided with a slit 41 permitting it to open sufficiently to receive the holder and machine screws 42 are provided, one at each end, for pressing the sides of the mount into engagement with the holder. The screws are adapted to be received within the pockets 40, previously referred to.

Although the description has been limited to a tool wherein only a single thread cutting bit is carried, it will be readily appreciated that bits similarly constructed may be arranged in gangs and suitably adjusted for the more rapid chasing of threads and particularly threads on large pieces where it might be advisable to cut only a portion of the full depth of the thread with one tool and complete the cutting of the depth of the thread with succeeding tools. Another advantage in mounting the bits in gangs is the minimizing of wear on the cutting edges 22 and 23.

Although the shaft or bit in essence is relatively simple in construction, nevertheless, the very simplicity of the construction is highly advantageous in adapting the shaft to the formation of a bit for cutting threads. By the provision of a thread cutting bit constructed as described, very accurate thread cutting operations can be carried out. Moreover, when the cutting edges become dull the bit may be precisely and accurately sharpened to renew the cutting edges by a grinding operation which follows the pitch provided initially for the faces 20 and 21. The pitch of the sides forming the groove in the shaft may be varied in different shafts inasmuch as rake angles of different amounts, thus formed, are more effective on certain metals than on others.

Proper cutting is also assured by the provision of holders 11 wherein the recesses are adapted to the particular shafts utilized in a selected operation. Improved results are assured when the angular direction of the recess 36 conforms with the degree of slope of the portions 18, which form the groove in the top of the shaft. If the groove is sharper and deeper, the angular direction of the recess 36 should be made to conform with it, in order to make certain that the cutting edges, rather than the longitudinal axis of the shaft are directed perpendicular to the line of tangency at the point of contact between the point 24 and the work. The adjustability and flexibility of the principles involved in the invention described herein make possible the assurance of precise results in lathe operations where threads are to be cut in material the composition of which is exceptionally resistant to ordinary cutting operations.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent methods.

Having described my invention, what I claim as new and desire to secure by Letters Patent is:

1. For use on a lathe, a combination tool and retainer therefor adapted to the cutting of threads on a rotating work piece comprising an elongated shaft of tool steel having a shallow V-shaped trough on the top face thereof, the sides of the groove being of equal width, means forming a pair of cutting edges extending obliquely forwardly across the sides of the trough, said sides being adapted to form a predetermined rake angle on each side adjacent the respective cutting edge, said means comprising faces directed angularly forward so that the upper ends of forward upright edges of said faces converge at an angle corresponding to the angle between threads at the level of the bottom of the trough, the angle of convergence along the upright edges being one extending progressively rearwardly toward the lower side of the shaft, said cutting edges making acute angles at the point of convergence relative to the axis of the shaft, and a holder having an open recess therein adapted to receive the shaft and shaft locking means in the holder, said recess being disposed at an angle to the longitudinal axis of the holder approximately equal to the acute angle between the cutting edges and the axis of the shaft.

2. For use on a lathe, a combination tool and retainer therefor adapted to the cutting of threads on a rotating work piece comprising an elongated shaft of tool steel having a shallow V-shaped trough on the top face thereof, means forming a pair of cutting edges extending obliquely forwardly along the sides of the trough and downwardly toward the bottom of said trough, said means comprising faces directed angularly forward so that the upper ends of forward upright edges of said faces converge at an angle corresponding to the angle of the groove between threads at the level of the bottom of the V-shaped trough, said cutting edges making obtuse angles relative to top side edges of the shaft, a holder having an open recess therein adapted to receive the shaft and shaft locking means in the holder, said recess being disposed at an angle to the longitudinal axis of the holder approximately equal to the angle between the cutting edges and the axis of the shaft, and a mount for the holder including means adapted to retain the holder in one of a plurality of positions of tilt about the longitudinal axis corresponding to the pitch of threads to be cut.

3. For use on a lathe, a combination tool and retainer therefor adapted to the cutting of threads on a rotating work piece comprising an elongated substantially rectangular shaft of tool steel having a shallow V-shaped trough on the top face thereof, the sides of the groove being of equal width, means forming a pair of cutting edges extending obliquely downwardly and forwardly along the sides of the trough having a predetermined rake angle, said means comprising faces directed angularly forward so that the upper ends of forward upright edges of said faces converge at the level of the bottom of the trough at an angle corresponding to the groove between threads to be cut, the angle of convergence along the upright edges being one of progressively diminishing degree toward the lower side of the shaft, said cutting edges making obtuse angles relative to top side edges of the shaft, a holder for the shaft having an open recess therein adapted to receive the shaft and shaft locking means in the holder, said recess being disposed at an angle to the longitudinal axis of the holder approximately equal to the obtuse angle between the cutting edges and the top side edges of the shaft, and a mount for the holder including means adapted to retain the holder in one of a plurality of positions of tilt about the longitudinal axis corresponding to the pitch of threads to be cut.

HILDA WEIDNER.

REFERENCES CITED

The following references are of record in the file of this patent:

UNITED STATES PATENTS

| Number | Name | Date |
|---|---|---|
| 398,918 | Whatley | Mar. 5, 1889 |

FOREIGN PATENTS

| Number | Country | Date |
|---|---|---|
| 227,458 | Germany | Oct. 21, 1910 |
| 138,141 | Great Britain | Feb. 5, 1920 |
| 247,958 | Great Britain | Aug. 12, 1926 |